(12) United States Patent
Kagata et al.

(10) Patent No.: US 8,662,651 B2
(45) Date of Patent: Mar. 4, 2014

(54) IMAGE RECORDING METHOD, RECORDING MATERIAL, AND IMAGE RECORDING APPARATUS

(75) Inventors: Takayoshi Kagata, Shiojiri (JP); Tsuyoshi Sano, Shiojiri (JP)

(73) Assignee: Seiko Epson Corporation (JP)

( * ) Notice: Subject to any disclaimer, the term of this patent is extended or adjusted under 35 U.S.C. 154(b) by 31 days.

(21) Appl. No.: 12/980,386

(22) Filed: Dec. 29, 2010

(65) Prior Publication Data

US 2011/0097558 A1    Apr. 28, 2011

Related U.S. Application Data

(63) Continuation-in-part of application No. 12/614,569, filed on Nov. 9, 2009, now abandoned.

(30) Foreign Application Priority Data

Nov. 10, 2008  (JP) .................................. 2008-288085
Nov. 4, 2009   (JP) .................................. 2009-253028

(51) Int. Cl.
   *B41J 2/01*      (2006.01)

(52) U.S. Cl.
   USPC ............................................. 347/100; 347/95

(58) Field of Classification Search
   USPC ...................... 347/100, 95, 96, 101, 102, 103;
                          106/31.6, 31.13, 31.27; 523/160, 161
   See application file for complete search history.

(56) References Cited

U.S. PATENT DOCUMENTS

| | | | | |
|---|---|---|---|---|
| 4,630,076 | A  * | 12/1986 | Yoshimura | 347/98 |
| 4,880,465 | A    | 11/1989 | Loria et al. | |
| 5,640,187 | A  * | 6/1997  | Kashiwazaki et al. | 347/101 |
| 5,749,951 | A    | 5/1998  | Yoshiike et al. | |
| 6,439,708 | B1 * | 8/2002  | Kato et al. | 347/100 |
| 6,877,850 | B2 * | 4/2005  | Ishimoto et al. | 347/96 |
| 7,134,749 | B2 * | 11/2006 | Ben-Zur et al. | 347/100 |
| 7,244,021 | B2 * | 7/2007  | Arai | 347/102 |
| 7,427,641 | B2   | 9/2008  | Kataoka et al. | |
| 7,604,693 | B2   | 10/2009 | Oyanagi et al. | |
| 2001/0020964 | A1 * | 9/2001 | Irihara et al. | 347/43 |
| 2003/0149130 | A1 * | 8/2003 | Kondo | 523/160 |

(Continued)

FOREIGN PATENT DOCUMENTS

| | | |
|---|---|---|
| JP | 59-115853 | 7/1984 |
| JP | 3-157467  | 7/1991 |

(Continued)

OTHER PUBLICATIONS

Translation of Japanese Application Publication No. 3-157467 Published Jul. 5, 1991.

(Continued)

*Primary Examiner* — Manish S Shah
(74) *Attorney, Agent, or Firm* — Harness, Dickey & Pierce, P.L.C.

(57) ABSTRACT

An image recording method is provided which includes forming an image on a recording medium by a color ink composition containing a color colorant and a white ink composition containing a white colorant, and in the above image recording method, the color ink composition and the white ink composition are adhered in this order to the recording medium so that an equivalent ratio of the white colorant to the color colorant is set to 10 to 500:1 to form a pastel color image.

18 Claims, 12 Drawing Sheets

(56) References Cited

U.S. PATENT DOCUMENTS

| | | | |
|---|---|---|---|
| 2003/0234848 A1* | 12/2003 | Ishikawa | 347/102 |
| 2005/0282928 A1* | 12/2005 | Lin et al. | 523/160 |
| 2006/0158481 A1 | 7/2006 | Spevak et al. | |
| 2006/0189712 A1* | 8/2006 | Kondo | 523/160 |
| 2008/0182083 A1* | 7/2008 | Oyanagi et al. | 106/31.65 |
| 2008/0213518 A1 | 9/2008 | Oyanagi et al. | |
| 2009/0182098 A1* | 7/2009 | Sano et al. | 525/453 |

FOREIGN PATENT DOCUMENTS

| | | |
|---|---|---|
| JP | 3-157664 | 7/1991 |
| JP | 3-277669 | 12/1991 |
| JP | 9-003380 | 1/1997 |
| JP | 9-316382 A | 12/1997 |
| JP | 2002-282744 A | 10/2002 |
| JP | 2003-192963 A | 7/2003 |
| JP | 2004-51776 A | 2/2004 |
| JP | 3562754 | 6/2004 |
| JP | 2005-023253 A | 1/2005 |
| JP | 2005-125690 A | 5/2005 |
| JP | 2008208332 A | 9/2008 |
| JP | 2008-239951 A | 10/2008 |
| WO | WO-2007-130561 A2 | 11/2007 |

OTHER PUBLICATIONS

Translation of Japanese Application Publication No. 3-157664 Published Jul. 5, 1991.

Translation of Japanese Application Publication No. 3-277669 Published Dec. 9, 1991.

Computer translation of Japanese Application Publication No. 9-316382 A Published Dec. 9, 1997.

Abstract of Japanese Application Publication No. 9-003380 Published Jan. 7, 1997.

Computer translation of Japanese Application Publication No. 2002-282744 Published Oct. 2, 2002.

Abstract of Japanese Application Publication No. 2003-192963 A Published Jul. 9, 2003.

Computer English Translation of Japanese Application Publication No. 2004-51776 A Published Feb. 19, 2004.

Computer English Translation of Japanese Application Publication No. 2005-125690A Published May 19, 2005.

Computer English Translation of Japanese Application Publication No. 2005-023253A Published Jan. 27, 2005.

Computer English Translation of Japanese 3562754 of Jun. 11, 2004.

* cited by examiner

IMAGE RECORDING METHOD, RECORDING MATERIAL, AND IMAGE RECORDING APPARATUS

This is a continuation in part of application Ser. No. 12/614,569 filed on Nov. 9, 2009 now abandoned, claims the benefit thereof and incorporates the same by reference.

BACKGROUND

1. Technical Field

The present invention relates to an image recording method for reproducing a pastel color. In addition, the invention also relates to a recording material obtained by the image recording method and an image recording apparatus using the image recording method.

2. Related Art

Heretofore, color reproduction of a pastel color has been performed by various methods. The pastel color is not a clearly defined color, such as an elementary color, and is an intermediate color located in a region in which the luminance is high and the saturation is low.

As a method for reproducing this pastel color, for example, in writing instruments, such as a ballpoint pen, reproduction of a pastel color is performed using a liquid composition as an pastel ink obtained by mixing a white colorant, such as hollow resin particles or titanium oxide, and a color colorant (for example, see JP-A-03-157664, JP-A-03-277669, and JP-A-09-316382). In addition, in image formation by an ink jet recording method or the like, reproduction is performed by jetting color ink compositions, such as cyan (C), magenta (M), yellow (Y), and black (K), to a recording medium without using a white ink composition so as to obtain a color having a high luminance and a low saturation.

Incidentally, as one color model that conceptually explains the color space, the CIE/L*a*b* color coordinate system has been known. Among the three parameters (L*, a*, b*) of the CIE/L*a*b* color coordinate system, L* indicates the luminance (brightness) of color, and a* and b* each indicate the chromaticity showing the hue and the saturation. In this color coordinate system, L*=0 indicates black, and L*=100 indicates white. In addition, a* indicates a position between red and green, a negative a* value indicates green, and a positive a* value indicates red. Furthermore, b* indicates a position between yellow and blue, a negative b* value indicates blue, and a positive b* value indicates yellow. Since the L*a*b* color model is a three-dimensional system, the color space is represented by a three-dimensional space, and the luminance is shown on the vertical axis. However, when image formation is performed by an ink jet recording method using only color ink compositions such as cyan (C), magenta (M), yellow (Y), and black (K), since the color ink compositions must be thinly coated on a recording medium in order to decrease the saturation, there is a pastel color that cannot be reproduced, in particular, in a high luminance region in which L*≥80 holds.

In addition, in JP-A-2005-125690, an image recording method has been disclosed in which when an image formed using color ink compositions has not a desired concentration, the concentration is controlled by jetting a white ink on the image to perform concentration correction. However, an object of the invention disclosed in JP-A-2005-125690 is to remove individual difference in color caused between recording apparatuses and to perform a strict color control from a low to a high concentration portion; hence, when an image has a lower concentration than a desired concentration, a small amount of a white ink is jetted on the image in order to increase the luminance thereof, and this technique is not intended to reproduce a pastel color.

SUMMARY

An advantage of some aspects of the invention is to provide a novel image recording method for reproducing a pastel color, and in particular, to provide an image recording method suitable to an ink jet recording system.

In accordance with a first aspect of the invention, there is provided an image recording method (1) comprising: forming an image on a recording medium by a color ink composition containing a color colorant and a white ink composition containing a white colorant. In the image recording method described above, the color ink composition and the white ink composition are adhered in this order to the recording medium so that an equivalent ratio of the white colorant to the color colorant is set to 1 to 1,000:1 to form a pastel color image.

In the image recording method (2) according to the above (1) which comprises: forming an image on a recording medium by a color ink composition containing a color colorant and a white ink composition containing a white colorant, the color ink composition and the white ink composition are adhered to the same region of the recording medium by relatively the same scanning of the recording medium and a recording head so that the equivalent ratio of the white colorant to the color colorant is set to 1 to 1,000:1 to form a pastel color image.

In the image recording method (3) according to the above (1), after the color ink composition containing a color colorant is adhered to the recording medium to form a color image thereon, the white ink composition containing a white colorant is adhered to the color image to form a white layer thereon, and the white layer is formed on the color image so that the equivalent ratio of the white colorant to the color colorant is set to 1 to 1,000:1 to form a pastel color image.

In the image recording method (4) according to one of the above (1) to (3), in the CIE/L*a*b* color space, the pastel color may be a color in which L*≥60, −50≤a*≤50, and −50≤b*≤50 hold.

In the image recording method (5) according to one of the above (1) to (4), the white colorant may be at least one selected from the group consisting of a metal compound and hollow resin particles.

In the image recording method (6) according to one of the above (1) to (5), the color colorant may be a pigment colorant or a dye colorant.

The image recording method (7) according to one of the above (1) to (6) may be performed by an ink jet recording system.

In accordance with a second aspect of the invention, there is provided a recording material (8) which is obtained by the image recording method according to one of the above (1) to (7).

In accordance with a third aspect of the invention, there is provided an image recording apparatus (9) which uses the image recording method according to one of the above (1) to (7).

According to the image recording method of the invention, a pastel color which has been difficult to be reproduced, particularly, by an ink jet recording system can be reproduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
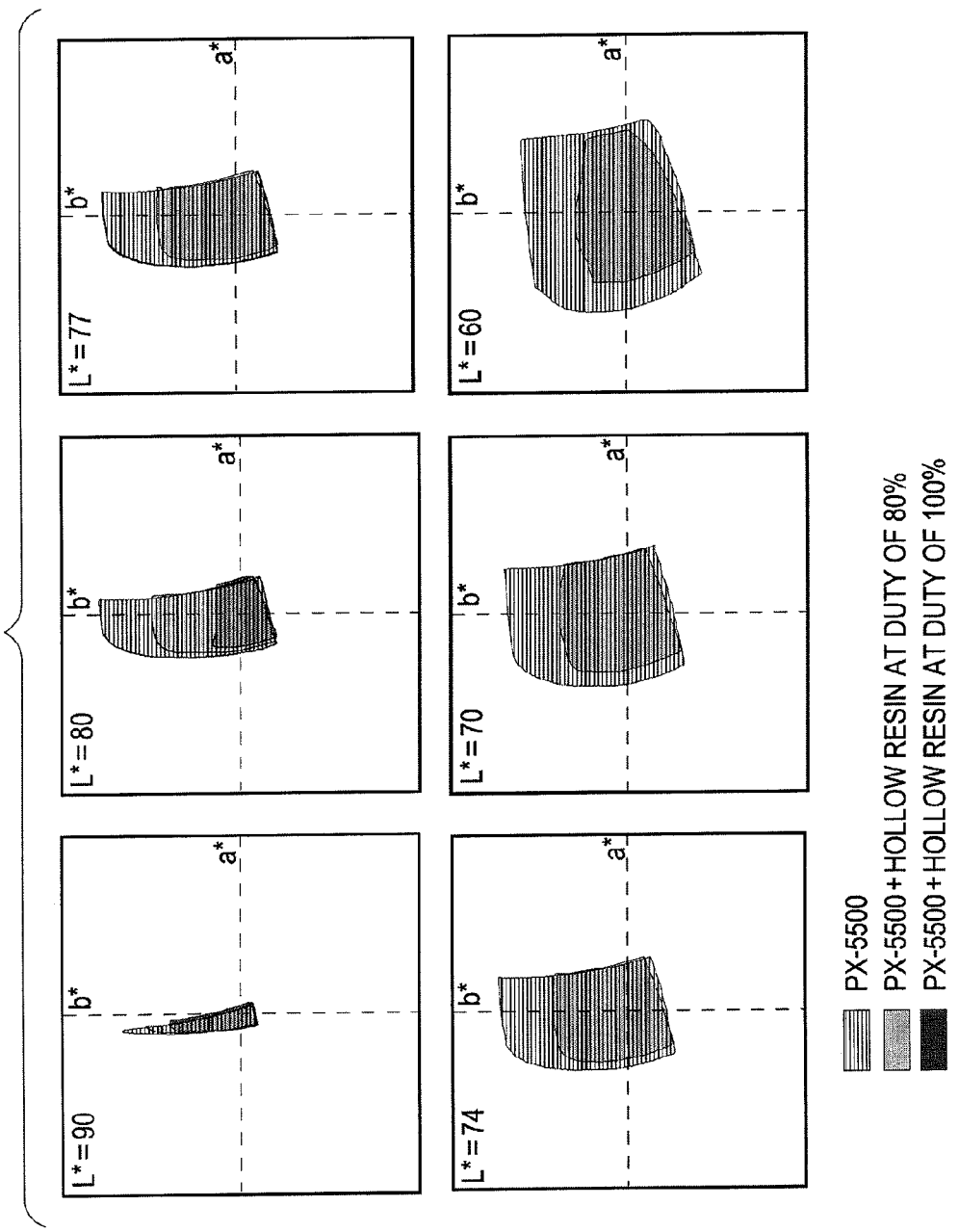
FIG. 1 shows comparisons each between a color reproducing region of a pastel color reproducible by color printing using a pigment color ink composition and a color reproducing region (Example 1) obtained by performing white printing (using hollow resin particles as a white colorant) at a duty of 80% or 100% after the color printing.

An image recording method of the invention relates to a novel image recording method for reproducing a pastel color. The image recording method of the invention is an image recording method in which after a color image is formed on a recording medium using a color ink composition which contains a color colorant, a white layer is formed on the color image using a white ink composition which contains a white colorant, and in this method, the white layer is formed on the color image so that an equivalent ratio of the white colorant to the color colorant is set to 1 to 1,000:1 to form a pastel color image.

In addition, in the invention, the pastel color indicates an intermediate color present in a region of the CIE/L*a*b* color space in which the luminance is high and the saturation is low and is preferably a color present in a region in which $L^* \geq 60$, $-50 \leq a^* \leq 50$, and $-50 \leq b^* \leq 50$ hold. In addition, the mass ratio between the color colorant and the white colorant is obtained based on each colorant amount (on a mass basis) per unit area when the image formation is performed on the recording medium. Hereinafter, the image recording method of the invention will be described in detail.

White Ink Composition

A white ink composition of the invention preferably contains at least one of a metal compound and hollow resin particles as a white colorant and a resin component fixing the colorant.

1. Metal Compound and Hollow Resin Particles

As the metal compound of the invention, for example, a metal oxide which has been used as a white pigment, barium sulfate, and calcium carbonate may be mentioned. Although the metal oxide is not particularly limited, for example, titanium dioxide, zinc oxide, silica, alumina, and magnesium oxide may be mentioned. As the metal compound of the invention, titanium dioxide and alumina are preferable.

The content of the metal compound is preferably 1.0 to 20.0 mass percent and more preferably 5.0 to 10.0 mass percent with respect to the total mass of the ink composition. When the content of the metal compound is more than 20.0 mass percent, the reliability may be degraded in some cases due to clogging of an ink jet recording head or the like. On the other hand, when the content is less than 1.0 mass percent, the color concentration, such as the degree of whiteness, tends to be deficient.

The average particle diameter (outside diameter) of the metal compound is preferably 30 to 600 nm and more preferably 200 to 400 nm. When the outside diameter is more than 600 nm, since the particles may precipitate, the dispersing stability may be degraded, and the reliability may also be degraded due to clogging of an ink jet recording head or the like. On the other hand, when the outside diameter is less than 30 nm, the degree of whiteness tends to be deficient.

The average particle diameter of the metal compound can be measured by a particle size distribution measurement apparatus using a laser diffraction scattering method as a measurement principle. As the laser diffraction particle size distribution measurement apparatus, for example, a particle size distribution meter (such as "Microtrack UPA" manufactured by Nikkiso Co., Ltd.) using a dynamic light scattering method as a measurement principle may be used.

As the hollow resin particles of the invention, particles which have hollows therein and which have outside shells formed from a liquid-permeable resin are preferable. By the structure described above, when the hollow resin particles are present in an aqueous ink composition, the inside hollows are filled with an aqueous medium. Since the particles filled with an aqueous medium has an approximately equivalent specific gravity to that of the outside aqueous medium, the particles may not precipitate in the aqueous ink composition, so that the dispersing stability can be maintained. As a result, the storage stability and ejection stability of the ink composition can be improved.

In addition, when the white ink composition of the invention is ejected to a recording medium, such as paper, the aqueous medium inside the particles are removed in drying, so that the hollows again obtained inside the particles. Since air is contained inside the particles, the particles each form a resin layer and an air layer having a refractive index different from that of the resin layer so as to effectively scatter incident light, and hence, a white color is shown.

The hollow resin particles used in the invention are not particularly limited, and known particles may be used. For example, hollow resin particles disclosed in U.S. Pat. No. 4,880,465 and Japanese Patent No. 3,562,754 are preferably used.

The average particle diameter (outside diameter) of the hollow resin particles is preferably 0.2 to 1.0 µm and more preferably 0.4 to 0.8 µm. When the outside diameter is more than 1.0 µm, since the particles may precipitate, the dispersing stability may be degraded, and for example, an ink jet recording head is clogged, so that the reliability may be degraded. On the other hand, when the outside diameter is less than 0.2 µm, the color concentration, such as the degree of whiteness, tends to be deficient. In addition, the inside diameter is appropriately about 0.1 to 0.8 µm.

The average particle diameter of the hollow resin particles can be measured by a particle size distribution measurement apparatus using a laser diffraction scattering method as a measurement principle. As the laser diffraction particle size distribution measurement apparatus, for example, a particle size distribution meter (such as "Microtrack UPA" manufactured by Nikkiso Co., Ltd.) using a dynamic light scattering method as a measurement principle may be used.

The content (solid component) of the hollow resin particles is preferably 5 to 20 mass percent and more preferably 8 to 15 mass percent with respect to the total mass of the ink composition. When the content (solid component) of the hollow resin particles is more than 20 mass percent, for example, an ink jet recording head is clogged, so that the reliability may be degraded. On the other hand, when the content is less than 5 mass percent, the degree of whiteness tends to be deficient.

A method for preparing the hollow resin particles is not particularly limited, and a know method may be used. As the method for preparing hollow resin particles, for example, a so-called emulsion polymerization method may be used in which a vinyl monomer, a surfactant, a polymerization initiator, and an aqueous dispersant are heated and stirred in a nitrogen atmosphere to form a hollow resin particle emulsion.

As the vinyl monomer, nonionic monoethylene unsaturated monomers, such as styrene, vinyl toluene, ethylene, vinyl acetate, vinyl chloride, vinylidene chloride, acrylonitrile, (meth)acrylamide, and (meth)acrylic acid ester, may be mentioned. As the (meth)acrylic acid ester, for example, methyl acrylate, methyl methacrylate, ethyl (meth)acrylate, butyl (meth)acrylate, 2-hydroxyethyl methacrylate, 2-ethylhexyl (meth)acrylate, benzyl (meth)acrylate, lauryl (meth)acrylate, oleyl (meth)acrylate, palmityl (meth)acrylate, and stearyl (meth)acrylate may be mentioned.

In addition, as the vinyl monomer, bifunctional vinyl monomers may also be used. As the bifunctional vinyl monomers, for example, divinyl benzene, allyl methacrylate, ethylene glycol dimethacrylate, 1,3-butanediol dimethacrylate, diethylene glycol dimethacrylate, and trimethylolpropane trimethacrylate may be mentioned. When highly cross linking is performed by copolymerizing the monofunctional vinyl monomer and the bifunctional vinyl monomer, hollow resin particles having properties such as heat resistance, solvent resistance, and solvent dispersibility as well the light scattering properties can be obtained.

As the surfactant, any surfactants each forming molecular aggregates, such as micelles, in water may be used, and for example, an anionic surfactant, a nonionic surfactant, a cationic surfactant, and an amphoteric surfactant may be mentioned.

As the polymerization initiator, a known compound which is soluble in water may be used, and for example, hydrogen peroxide and potassium persulfate may be mentioned.

As the aqueous dispersant, for example, water and water containing a hydrophilic organic solvent may be mentioned.

2. Fixing Resin

The white ink composition of the invention preferably contains a resin fixing the hollow resin particles. As this fixing resin, for example, an acrylic resin (such as Almatex (manufactured by Mitsui Chemicals Inc.)) and a urethane resin (such as WBR-022U (manufactured by Taisei Fine Chemical Co., Ltd.) may be mentioned.

The content of the fixing resin described above is preferably 0.5 to 10 mass percent and more preferably 0.5 to 3.0 mass percent with respect to the total mass of the ink composition.

3. Permeable Organic Solvent

The white ink composition of the invention preferably contains at least one selected from an alkanediol and a glycol ether. The alkanediol and the glycol ether can increase the wettability of an ink to a recording surface of a recording medium or the like, so that the permeability of the ink can be improved.

The alkanediol is preferably a 1,2-alkanediol having 4 to 8 carbon atoms, such as 1,2-butanediol, 1,2-pentanediol, 1,2-hexanediol, 1,2-heptanediol, or 1,2-octanediol. Among those mentioned above, 1,2-hexanediol, 1,2-heptanediol, and 1,2-octanediol, each having 6 to 8 carbon atoms, are more preferable since the permeability thereof to a recording medium is particularly high.

As the glycol ether, for example, a lower alkyl ether of a polyol, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, or tripropylene glycol monomethyl ether. Among those mentioned above, by using triethylene glycol monobutyl ether, a superior recording quality can be obtained.

The content of the at least one selected from the group consisting of an alkanediol and a glycol ether is preferably 1 to 20 mass percent and more preferably 1 to 10 mass percent with respect to the total mass of the white ink composition.

4. Surfactant

The white ink composition of the invention preferably contains an acetylene glycol-based surfactant or a polysiloxane-based surfactant. The acetylene glycol-based surfactant or the polysiloxane-based surfactant can increase the wettability of an ink to a recording surface of a recording medium or the like, so that the permeability of the ink can be increased.

As the acetylene glycol-based surfactant, for example, 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyn-3-ol may be mentioned. In addition, a commercially available acetylene glycol-based surfactant may also be used, and for example, Olfin E1010, STG, and Y (manufactured by Nisshin Chemical Industry Co., Ltd.) and Surfynol 104, 82, 465, 485, and TG (manufactured by Air Products and Chemicals Inc.) may be mentioned.

As the polysiloxane-based surfactant, for example, a commercially available surfactant may be used, and for example, BYK-347 and BYK-348 (manufactured by BYK-Chemie, Japan) may be mentioned.

Furthermore, the white ink composition of the invention may contain another surfactant, such as an anionic surfactant, a nonionic surfactant, or an amphoteric surfactant.

The content of the surfactant is preferably 0.01 to 5 mass percent and more preferably 0.1 to 0.5 mass percent with respect to the total mass of the white ink composition.

5. Tertiary Amine

The white ink composition of the invention preferably contains a tertiary amine. The tertiary amine functions as a pH adjuster and can easily adjust the pH of the white ink composition.

As the tertiary amine, for example, triethanolamine may be mentioned.

The content of the above tertiary amine is preferably 0.01 to 10 mass percent and more preferably 0.1 to 2 mass percent with respect to the total mass of the white ink composition.

6. Solvent and Additives

The white ink composition of the invention usually contains water as a solvent. As the water, pure water or ultrapure water, such as ion-exchanged water, ultrafiltration water, reverse osmosis water, or distilled water, is preferably used. In particular, water prepared by sterilizing the above-mentioned water with ultraviolet irradiation or addition of hydrogen peroxide is preferable since the growth of fungi and bacteria can be suppressed for a long period of time.

The white ink composition of the invention may contain additives whenever necessary, and for example, a fixing agent such as water-soluble rosin, a fungicide or antiseptic such as sodium benzoate, an antioxidant or ultraviolet absorber such as an allophanate, a chelating agent, and an oxygen absorbent may be used. These additives may be used alone, and of course, at least two thereof may be used in combination.

7. Preparation Method

The white ink composition of the invention may be prepared by a known apparatus, such as a ball mill, a sand mill, an attritor, a basket mill, or a roll mill, in a manner similar to that for a related pigment ink. In the preparation, coarse particles are preferably removed using a membrane filter, a mesh filter, or the like.

Color Ink Composition

As the color ink composition of the invention, any color ink composition may be used as long as it contains a color colorant, and a color ink composition exhibiting color other than white is preferable. The color ink composition of the invention is not particularly limited, and a commercially available color ink composition may also be used.

As the color colorant, either a pigment colorant or a dye colorant may be used, and for example, color ink compositions disclosed in JP-A-2003-192963, JP-A-2005-23253, JP-A-9-3380, and JP-A-2004-51776 may be preferably used.

In addition, the "color" of the invention does not indicate a specific color region but indicates all regions which are generally believed to have color. That is, in the "L*a*b* coordinate system, the "color" of the invention indicates a color located at coordinates other than those in which L*=100, a*=0, and b*=0 (ideal white) hold.

Image Recording Method

The image recording method of the invention is an image recording method to form an image on a recording medium using a color ink composition containing a color colorant and a white ink composition containing a white colorant, and the color ink composition and the white ink composition are adhered to the recording medium in this order so that an equivalent ratio of the white colorant to the color colorant is set to 1 to 1,000:1 to form a pastel color image.

The image formation using a color ink composition and a white ink composition includes, as described below, an embodiment in which after a color image layer is formed (adhered and dried) in advance by a color ink composition in an arbitrary region in which a pastel color is to be formed, a white layer is formed by a white ink composition on the color image layer, and an embodiment in which in an arbitrary region in which a pastel color is to be formed, a color ink composition and a white ink composition are adhered to the same region of a recording medium to form an image by relatively the same scanning of the recording medium and a recording head of an image recording apparatus. As the latter embodiment, for example, image formation may be mentioned which is performed by an image forming apparatus, such as an ink jet recording apparatus, including a recording head capable of ejecting liquid droplets. In the image forming apparatus as described above, while the recording head and the recording medium are relatively scanned, ink is ejected to the recording medium from the recording head to form an image. The relative scanning is that while at least one of the recording head and the recording medium is moved with respect to the other, ink is ejected from the recording head so as to be adhered to the recording medium. In the image forming apparatus including a recording head, first, based on image data received from an image data forming portion provided in a host computer or the like, various dot pattern data by a white ink composition and a color ink composition are formed. Next, various types of inks ejected from nozzle lines of the recording head are adhered to a recording medium so as to record various dots (white dots and color dots) corresponding to the above dot pattern data on the recording medium, and as a result, an image is formed. At this stage, when the recording head is scanned, in a scanning direction thereof, various color and white dots are sequentially recorded on pixels located in regions of the recording medium which face the recording head, so that an image is formed. The scanning direction is a recording head travelling direction when the recording head is moved with respect to the recording medium for scanning or is a medium transport direction when the recording medium is moved with respect to the recording head for scanning. Accordingly, the various dots forming the pixels are formed on the same region (scanning region per one time) of the recording medium by the same scanning of the recording head and the recording medium. In addition, at this stage, among the nozzle lines of the recording head, a nozzle line which ejects a color ink composition is disposed at a front side in the direction in which the recording head is relatively scanned with respect to the recording medium as compared to a nozzle line which ejects a white ink composition. By the structure as described above, the color ink composition and the white ink composition are adhered to the same region of the recording medium in this order. When the recording head is moved with respect to the recording medium for scanning, so-called unidirectional printing is performed.

In the invention, a white dot is not required to completely overlap a color dot and may partly overlap the color dot. In addition, a mixed color portion may also be present.

As in the former embodiment described above in which after the color image layer is formed (adhered and dried) in advance, the white layer is formed thereon, the color image formation and the formation method of the white layer are not particularly limited, and for example, a relief printing method, an intaglio printing method, a planographic printing method, a screen printing method, an electrophotographic recording method, a thermal transfer recording method, and an ink jet recording method may be mentioned. Among those mentioned above, an ink jet recording method is particularly preferable.

The ink jet recording method may be applied to various types of ink jet recording methods. As the ink jet recording method, for example, thermal jet type ink jet, piezoelectric type ink jet, continuous ink jet, roller application, and spray application may be mentioned.

The white colorant is preferably in an amount of 10 to 500 equivalents and more preferably in an amount of 100 to 300 equivalents with respect to 1 equivalent of the color colorant. The mass ratio between the color colorant and the white colorant is a colorant mass ratio (mass basis) per unit area when image formation is performed on the recording medium. In particular, in the case in which the image recording method of the invention is performed using an ink jet recording apparatus or the like, when dot pattern data is formed based on image data formed by an image forming portion, it is preferable that the amount of the white colorant be fixed, and that the amount of the color colorant be adjusted with respect to that of the white colorant.

According to the invention, when the amount of the white colorant is adjusted with respect to that of the color colorant to be image-recorded, an arbitrary pastel color can be reproduced.

The color image and the white layer may be formed by applying the respective ink compositions to various recording media. As the recording media, for example, paper, heavy paper, fiber products, sheets, films, plastics, glass, and ceramics may be mentioned.

Recording Material and Recording Apparatus

The invention is able to provide a recording material on which a pastel color image, which has been difficult to be reproduced, is recorded by the image recording method described above.

In addition, the invention is also able to provide an image recording apparatus which uses the above image recording method. By the image recording apparatus described above, a pastel color image, which has been difficult to be reproduced, can be formed.

EXAMPLES

Hereinafter, the invention will be described in more detail with reference to Examples; however, the invention is not limited thereto.

White Ink Composition

First, in accordance with compositions shown in Table 1, white ink compositions (ink 1 and ink 2) each containing white hollow resin particles or a metal compound as a colorant were prepared. In this Table, the numerical values are on a mass percent basis.

TABLE 1

| COMPONENT | SOLID COMPONENT (%) | INK 1 | INK 2 |
|---|---|---|---|
| WHITE HOLLOW RESIN PARTICLES SX8782(D) | 20.5 | 10 | — |
| METAL OXIDE (TITANIUM DIOXIDE) NanoTek (R) Slurry | 15.0 | — | 10 |
| URETHANE RESIN | 30.0 | 5 | 5 |
| GLYCERIN | — | 10 | 10 |
| 1,2-HEXANEDIOL | — | 3 | 3 |
| TRIETHANOLAMINE | — | 0.5 | 0.5 |
| BYK-348 | — | 0.5 | 0.5 |
| ION-EXCHANGED WATER | — | BALANCE | BALANCE |
| TOTAL | — | 100 | 100 |

As the hollow resin particles, a commercially available product, "SX8782(D)" (manufactured by JSR Corporation), shown in Table 1 was used. "SX8782(D)" was an aqueous dispersion product containing particles having an outer diameter of 1.0 μm and an inner diameter of 0.8 μm, and the solid component concentration of this product was 20.5%.

As the metal compound, a commercially available product, "NanoTek (R) Slurry" (manufactured by C. I. Kasei Co., Ltd.) was used. "NanoTek (R) Slurry" was a slurry containing titanium dioxide having an average particle diameter of 36 nm, and the solid component of this slurry was 15%.

"BYK-348" (manufactured by BYK Chemie Japan) was a polysiloxane-based surfactant.

As the urethane resin, "WBR-022U" (manufactured by Taisei Fine Chemical Co., Ltd.) was used.

Image Recording (1) Reproduction of Pastel Color by Forming White Layer on Color Image Layer Image Recording (1)-1: Use of Pigment Color Ink Composition The formation of a color image was performed by printing using a commercially available ink jet printer ("PX-5500" manufactured by Seiko Epson Corporation) and a commercially available ink set (Epson IC9CL3337 including photo black, matte black, gray, light gray, yellow, cyan, light cyan, magenta, and light magenta).

In addition, the formation of a white layer was performed in such a way that after the white ink composition shown in Table 1 was first filled in a black ink chamber of an exclusive cartridge of an ink jet printer ("PX-G930" manufactured by Seiko Epson Corporation), the ink cartridge thus prepared was fitted in the printer, and then printing was performed.

By the above-described printing method for each color, a sample was obtained by performing color printing (printing condition: paper selection-photo paper gloss, no-color correction, photo-1,440 dpi, and unidirectional printing) on a medium (photo paper <gloss> manufactured by Seiko Epson Corporation) using the ink jet printer "PX-5500", and the white ink composition was then printed on the sample using the ink jet printer "PX-G930" at a duty of 80% or 100%. Subsequently, the gamut obtained thereby was measured. In this example, the printing was performed so that the mass ratio of the white colorant to the color colorant printed on the recording medium was 200:1 to 1:1. The reason the mass ratio was wide, such as 200 to 1, was that since the usage of the color ink displaying the gamut was not constant, the mass ratio was determined based on the upper limit of the mass ratio which was obtained from a maximum white-ink usage of 200 and a minimum color-ink usage of 1.

In this specification, the "duty" is a value calculated in accordance with the following equation.

Duty (%)=100×Actual number of printed dots/(vertical resolution×horizontal resolution)

In the above equation, the "actual number of printed dots" is an actual number of printed dots per unit area, and the "vertical resolution" and the "horizontal resolution" each indicate the resolution per unit area. A duty of 100% indicates the maximum ink mass of a single color per one pixel.

Example 1

FIG. 1 shows comparisons each between a color reproducing region of a pastel color reproducible by the color compositions (photo black, matte black, gray, light gray, yellow, cyan, light cyan, magenta, and light magenta) under the above printing conditions and a color reproducing region obtained when the white printing (using the hollow resin particles as the white colorant) is performed at a duty of 80% or 100% after the color printing. In this case, in regions in each of which L* was less than 80 shown in FIG. 1, when the duty was 100%, the ink overflowed; hence, a gamut at a duty of 80% is only shown.

In the invention, the CIE/L*a*b* values were measured by Gretag Macbeth Spectroscan and Spectrolino (manufactured by X-Rite Inc.).

From FIG. 1, it is found that in a high luminance region (a region having an L* of 70 or more, and in particular, a gamut at an L* of 80 or 90), a region which cannot be reproduced only by a color composition (composite composed of cyan, magenta, yellow, photo black, light cyan, and light magenta) can be color-reproduced by performing the white printing after the color printing.

Example 2

Figure 2:
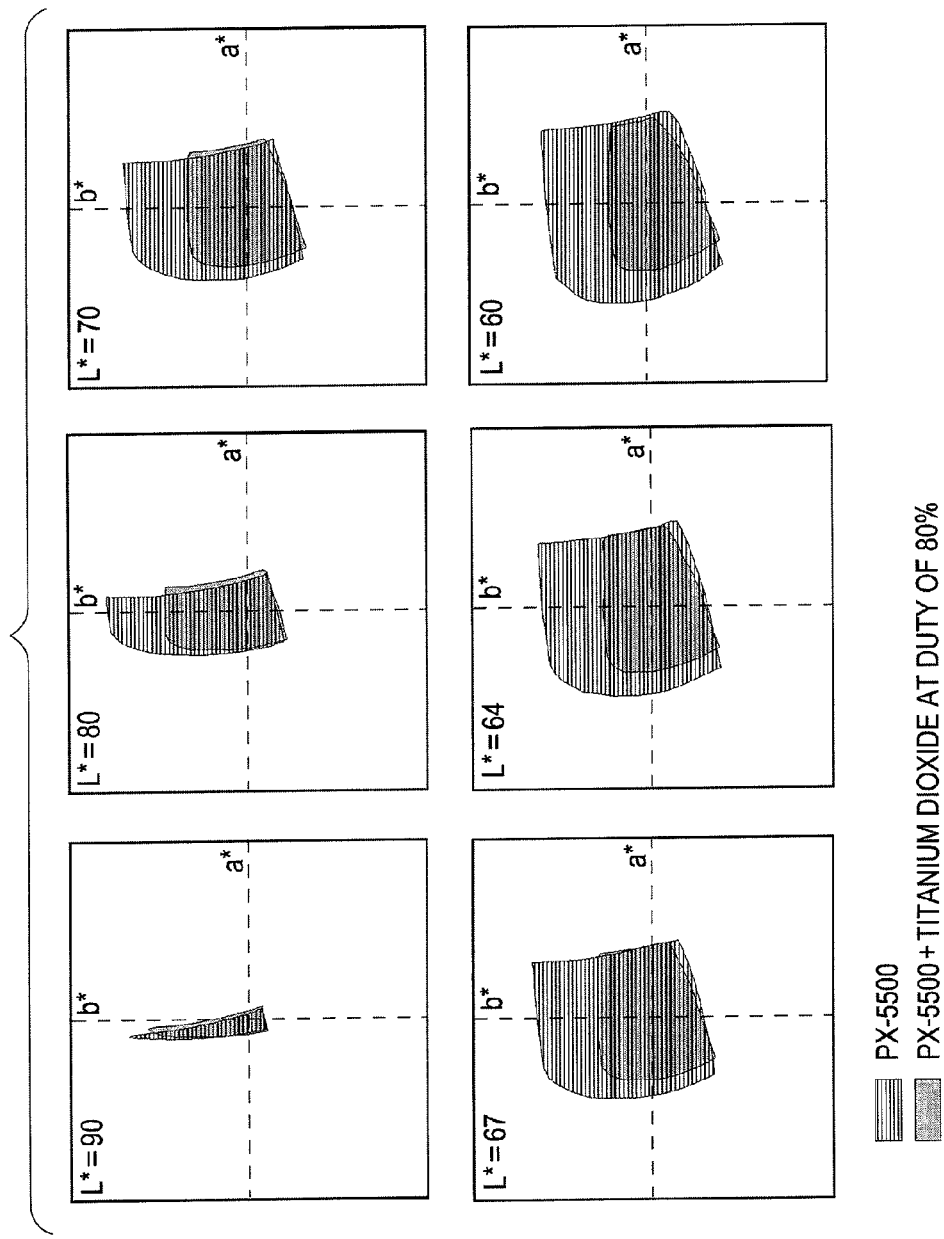
FIG. 2 shows comparisons each between a color reproducing region of a pastel color reproducible by color printing using a pigment color ink composition and a color reproducing region (Example 2) obtained by performing white printing (using titanium dioxide as a white colorant) at a duty of 80% after the color printing.

FIG. 2 shows comparisons each between a color reproducing region of a pastel color reproducible by the color compositions (photo black, matte black, gray, light gray, yellow, cyan, light cyan, magenta, and light magenta) under the above printing conditions and a color reproducing region obtained when the white printing (using titanium dioxide as the white colorant) is performed at a duty of 80% after the color printing.

From FIG. 2, it is found that in a high luminance region (a region having an L* of 64 or more), a region which cannot be reproduced only by a color composition (composite composed of cyan, magenta, yellow, photo black, light cyan, and light magenta) can be color-reproduced by performing the white printing after the color printing.

Image Recording (1)-2: Use of Dye Color Ink Composition

The formation of a color image was performed by printing using a commercially available ink jet printer ("EPSON PM-A840" manufactured by Seiko Epson Corporation) and an ink set (Epson IC6CL50 including black, yellow, cyan, light cyan, magenta, and light magenta).

In addition, the formation of a white layer was performed in such a way that after the white ink composition shown in Table 1 was filled in a black ink chamber of an exclusive cartridge of an ink jet printer ("PX-G930" manufactured by Seiko Epson Corporation), the ink cartridge thus prepared was fitted in the printer, and then printing was performed.

By the above-described printing method for each color, a sample was obtained by performing color printing (printing condition: paper selection-photo paper gloss, no-color correction, photo-1,440 dpi, and unidirectional printing) on a medium (photo paper <gloss> manufactured by Seiko Epson Corporation) using the ink jet printer "PM-A840", and the white ink composition was then printed on the sample using the ink jet printer "PX-G930" at a duty of 80%. Subsequently, the gamut obtained thereby was measured. In this example, the printing was performed so that the mass ratio of the white colorant to the color colorant printed on the recording medium was 200:1 to 1:1. The reason the mass ratio was wide, such as 200 to 1, was that since the usage of the color ink displaying the gamut was not constant, the mass ratio was determined based on the upper limit of the mass ratio which was obtained from a maximum white-ink usage of 200 and a minimum color-ink usage of 1.

Example 3

Figure 3:
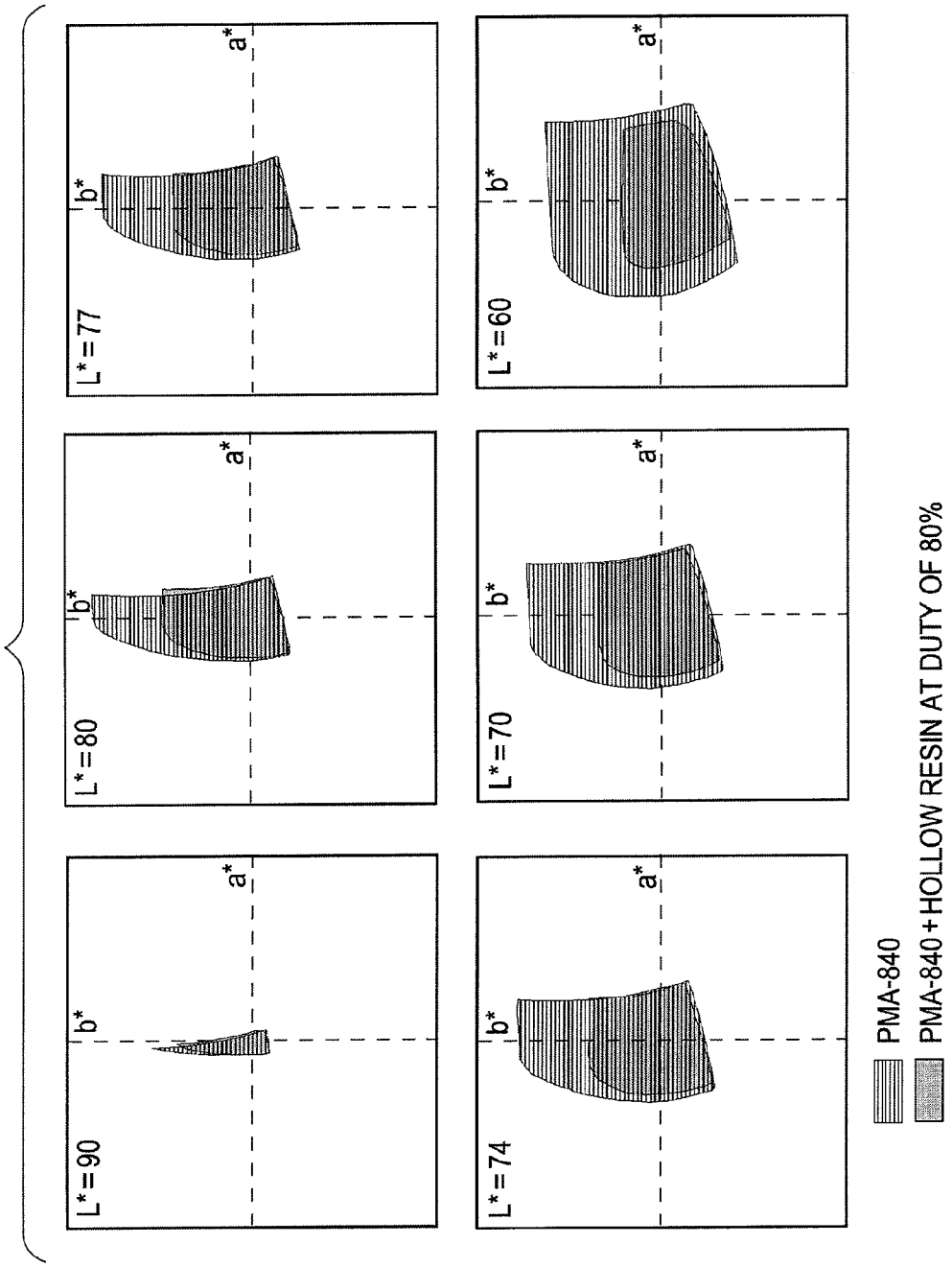
FIG. 3 shows comparisons each between a color reproducing region of a pastel color reproducible by color printing using a dye color ink composition and a color reproducing region (Example 3) obtained by performing white printing (using hollow resin particles as a white colorant) at a duty of 80% after the color printing.

FIG. 3 shows comparisons each between a color reproducing region of a pastel color reproducible by the color compositions (black, yellow, cyan, light cyan, magenta, and light magenta) under the above printing conditions and a color reproducing region obtained when the white printing (using the hollow resin particles as the white colorant) is performed at a duty of 80% after the color printing.

From FIG. 3, it is found that in a high luminance region (a region having an L* of 74 or more), a region which cannot be reproduced only by a color composition (composite composed of black, yellow, cyan, light cyan, magenta, and light magenta) can be color-reproduced by performing the white printing after the color printing.

Example 4

Figure 4:
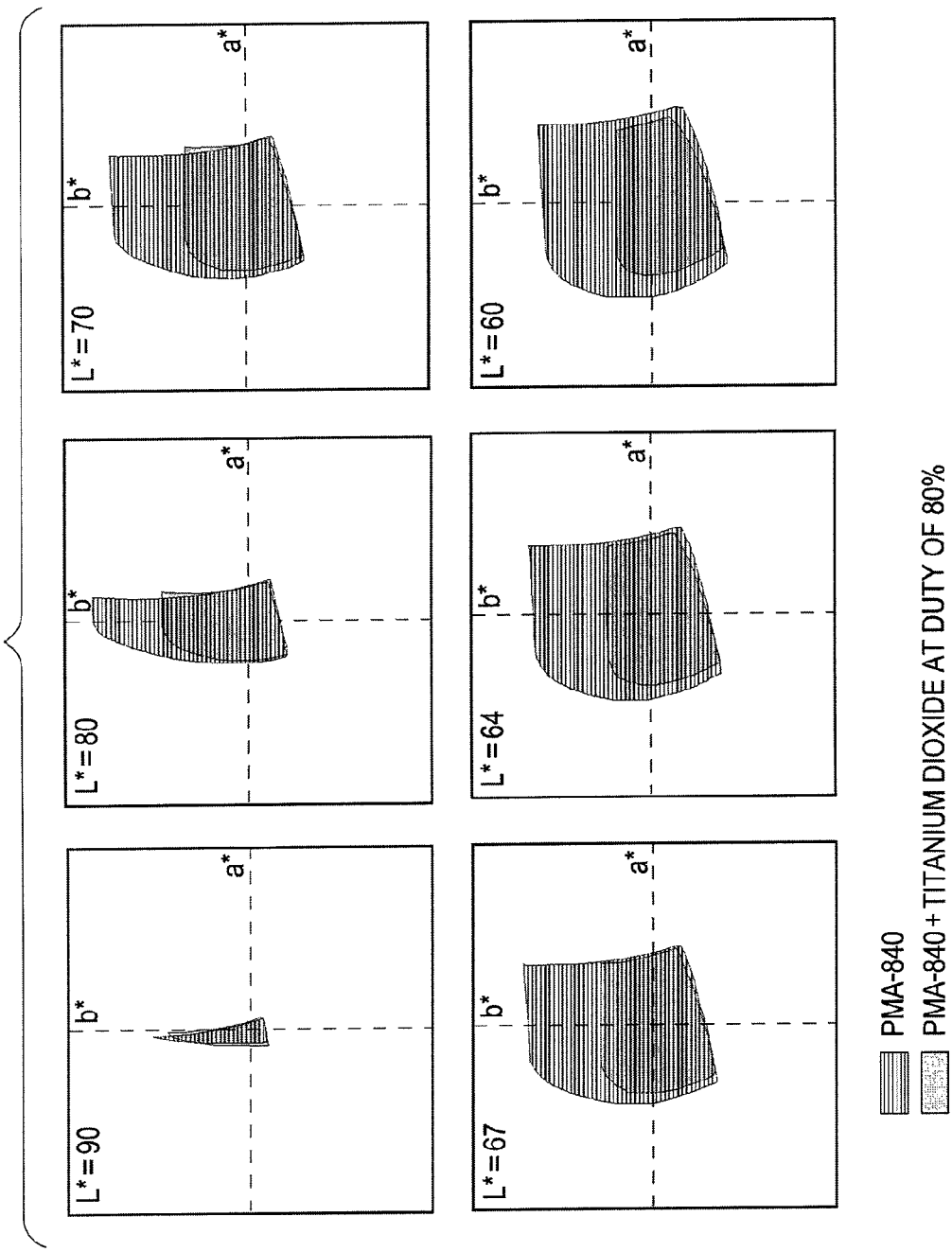
FIG. 4 shows comparisons each between a color reproducing region of a pastel color reproducible by color printing using a dye color ink composition and a color reproducing region (Example 4) obtained by performing white printing (using titanium dioxide as a white colorant) at a duty of 80% after the color printing.

FIG. 4 shows comparisons each between a color reproducing region of a pastel color reproducible by the color compositions (black, yellow, cyan, light cyan, magenta, and light magenta) under the above printing conditions and a color reproducing region obtained when the white printing (using titanium dioxide as the white colorant) is performed at a duty of 80% after the color printing.

From FIG. 4, it is found that in a high luminance region (a region having an L* of 67 or more), a region which cannot be reproduced only by a color composition (composite composed of black, yellow, cyan, light cyan, magenta, and light magenta) can be color-reproduced by performing the white printing after the color printing.

Since the hollow resin particles have a higher luminance than that of titanium dioxide, when printing is performed under the same conditions, an L* value at which a pastel color is obtained is high when the hollow resin particles are used. On the other hand, at a relatively low L* value, such as approximately 60 to 70, titanium dioxide is more effective.

L*a*b* Value Numerical Data

Comparison results are shown in the following Table 2 in which in FIGS. 1 to 4, an a* value at an end point portion (an upper right end point of a protruding portion of the white printing region protruding from the color printing region) of the gamut obtained when the white printing is performed after the color printing is compared with an a* value at an end point portion of the gamut obtained only by the color printing while the L* value and the b* value are fixed based on the above end point of the protruding portion. In every case, the gamut of the image sample obtained by performing the white printing after the color printing further extends in a positive a* value direction from that obtained only by the color printing.

TABLE 2

| FIGURE NUMBER | COLOR COLORANT/WHITE COLORANT | duty (%) | COLOR PRINTING FOLLOWED BY WHITE PRINTING | | | COLOR PRINTING ONLY | | | |
|---|---|---|---|---|---|---|---|---|---|
| | | | L* | $a_1$* | b* | L* | $a_2$* | b* | $\Delta a_1$*-$a_2$* |
| FIG. 1 | COLOR PIGMENT/HOLLOW RESIN PARTICLES | 100 | 90 | -3.2 | 40.0 | 90 | -5.2 | 40.0 | 2.0 |
| | | 100 | 80 | 16.8 | 12.8 | 80 | 14.4 | 12.8 | 2.4 |
| | | 80 | 90 | -6.0 | 53.2 | 90 | -6.8 | 53.2 | 0.8 |
| | | 80 | 80 | 10.8 | 49.2 | 80 | 9.2 | 49.2 | 1.6 |
| | | 80 | 70 | 28.0 | 36.0 | 70 | 27.6 | 36.0 | 0.4 |
| FIG. 2 | COLOR PIGMENT/TITANIUM DIOXIDE | 80 | 90 | -4.0 | 56.0 | 90 | -6.4 | 56.0 | 2.4 |
| | | 80 | 80 | 15.2 | 47.0 | 80 | 10.8 | 47.0 | 4.4 |
| | | 80 | 70 | 32.0 | 32.0 | 70 | 28.4 | 32.0 | 3.6 |
| | | 80 | 64 | 40.0 | 24.0 | 64 | 39.3 | 24.0 | 0.7 |
| FIG. 3 | COLOR DYE/HOLLOW RESIN PARTICLES | 80 | 90 | -1.6 | 40.0 | 90 | -3.2 | 40.0 | 1.6 |
| | | 80 | 80 | 16.4 | 46.8 | 80 | 12.0 | 46.8 | 4.4 |
| | | 80 | 74 | 23.4 | 39.3 | 74 | 22.8 | 39.3 | 0.6 |
| FIG. 4 | COLOR DYE/TITANIUM DIOXIDE | 80 | 90 | -1.2 | 46.6 | 90 | -3.2 | 46.6 | 2.0 |
| | | 80 | 80 | 16.0 | 46.4 | 80 | 12.0 | 46.4 | 4.0 |
| | | 80 | 70 | 33.6 | 32.8 | 70 | 29.6 | 32.8 | 4.0 |
| | | 80 | 67 | 33.9 | 26.1 | 67 | 30.3 | 26.1 | 3.6 |

Image recording (2) Reproduction of pastel color by relatively the same scanning of recording head and recording medium to adhere color ink composition and white ink composition to the same region of recording medium Image Recording (2)-1: Use of Pigment Color Ink Composition The formation of a color image and a white image was performed using a commercially available ink jet printer ("PX-5500" manufactured by Seiko Epson Corporation).

As the color ink composition, an ink set (EPSON IC9CL3337, photo black, matte black, gray, yellow, cyan, light cyan, magenta, and light magenta) was used. As the white ink composition, the white ink composition shown in Table 1 was used and was filled in a light gray ink chamber of an exclusive cartridge of an ink jet printer ("PX-5500" manufactured by Seiko Epson Corporation). Next, the ink cartridge thus formed was fitted in the printer, and the color ink composition and the white ink composition were printed to be adhered to the same region of the recording medium by relatively the same scanning of the recording head and the recording medium, so that the formation of image was performed.

The gamut was measured when color printing and white printing (printing condition: paper selection-photo paper gloss, no-color correction, photo-1,440 dpi, and unidirectional printing) were performed under the condition in which the duty of the white ink composition was 80% on a medium (photo paper <gloss> manufactured by Seiko Epson Corporation) using the ink jet printer "PX-5500" by the above printing method. In this example, printing was performed so that the mass ratio of the white colorant to the color colorant printed on the recording medium was 200:1 to 1:1. The reason the mass ratio was wide, such as 200 to 1, was that since the usage of the color ink displaying the gamut was not constant, the mass ratio was determined based on the upper limit of the mass ratio which was obtained from a maximum white-ink usage of 200 and a minimum color-ink usage of 1.

Example 5

Figure 5:
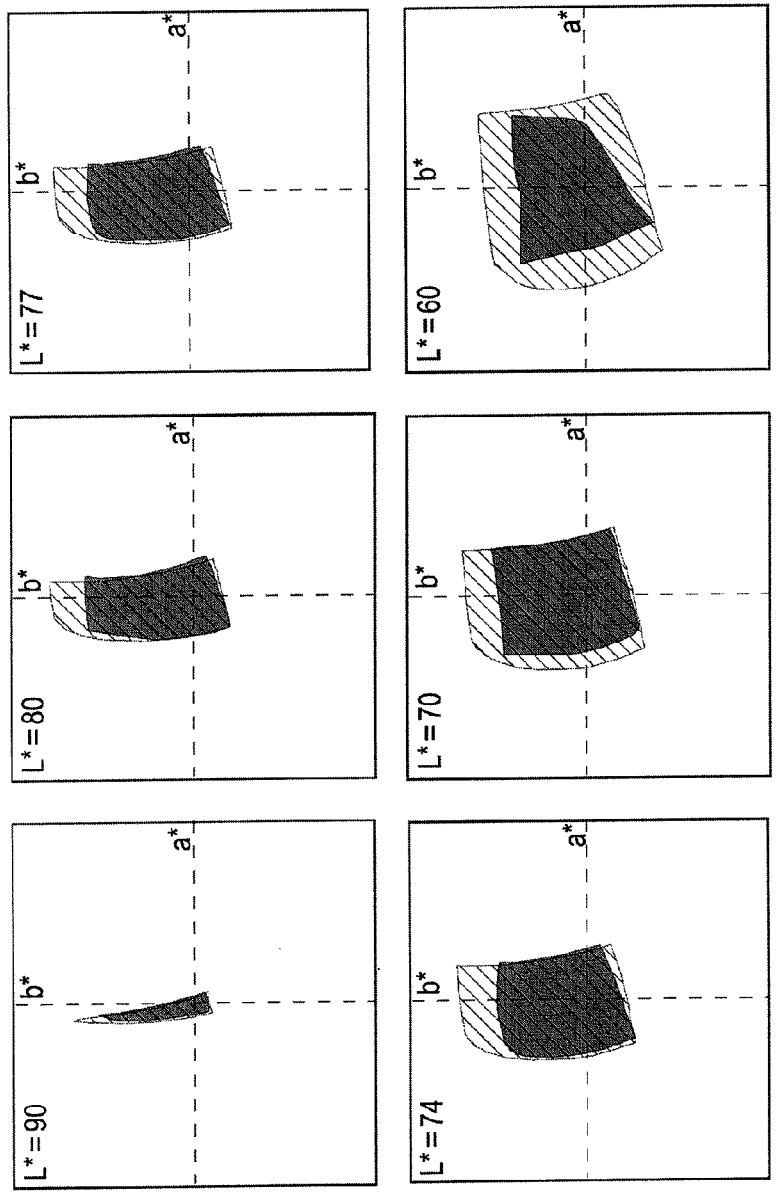
FIG. 5 shows comparisons each between a color reproducing region of a pastel color reproducible by a pigment color ink composition and a color reproducing region obtained in the case (Example 5) in which the pigment color ink composition and a white ink composition (hollow resin particles are used as a white colorant, and printing is performed at a duty of 80%) are adhered to the same region of a recording medium by relatively the same scanning of the recording medium and a recording head.

FIG. 5 shows comparisons each between a color reproducing region of a pastel color reproducible by a color ink composition (photo black, matte black, gray, light gray, yellow, cyan, light cyan, magenta, and light magenta) under the above printing conditions and a color reproducing region obtained in the case (Example 5) in which the color ink composition and a white ink composition (ink composition 1 (hollow resin particles as a white colorant) was used) were adhered to the same region of the recording medium by relatively the same scanning of the recording medium and the recording head. The white dot was formed at a duty of 80%.

From FIG. 5, it is found that in a high luminance region (in a region in which L* is 70 or more, and in particular, a gamut at an L* of 80 or 90), a region which cannot be reproduced only by the color ink composition (composite including cyan, magenta, yellow, photo black, light cyan, light magenta, matte black, gray, and light gray) can be reproduced.

Example 6

Figure 6:
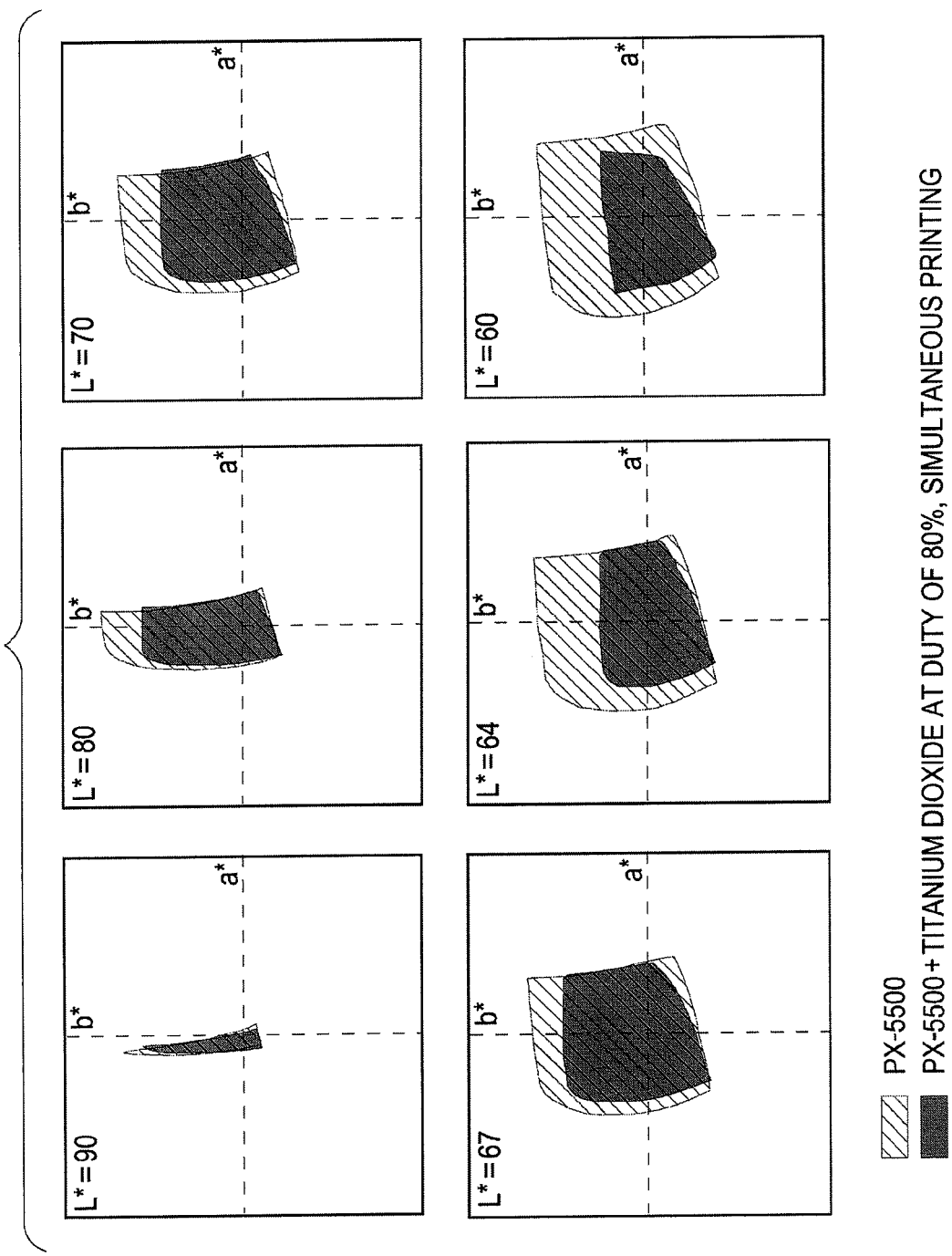
FIG. 6 shows comparisons each between a color reproducing region of a pastel color reproducible by a pigment color ink composition and a color reproducing region obtained in the case (Example 6) in which the pigment color ink composition and a white ink composition (titanium dioxide is used as a white colorant, and printing is performed at a duty of 80%) are adhered to the same region of a recording medium by relatively the same scanning of the recording medium and a recording head.

FIG. 6 shows comparisons each between a color reproducing region of a pastel color reproducible by a color ink composition (photo black, matte black, gray, light gray, yellow, cyan, light cyan, magenta, and light magenta) under the above printing conditions and a color reproducing region obtained in the case (Example 6) in which the color ink composition and a white ink composition (ink composition 2 (titanium dioxide as a white colorant) was used) were adhered to the same region of the recording medium by relatively the same scanning of the recording medium and the recording head. The white dot was formed at a duty of 80%.

From FIG. 6, it is found that in a high luminance region (in a region in which L* is 64 or more), a region which cannot be reproduced only by the color ink composition (composite including cyan, magenta, yellow, photo black, light cyan, light magenta, matte black, gray, and light gray) can be reproduced.

Image Recording (2)-2: Use of Dye Color Ink Composition

For the formation of a color image, a commercially available ink set (EPSON IC6CL50, black, yellow, cyan, light cyan, magenta, and light magenta) was filled in an exclusive cartridge of an ink jet printer ("PX-5500" manufactured by Seiko Epson Corporation), and the ink cartridge thus formed was fitted in the printer. For the formation of a white image, the white ink composition shown in Table 1 was filled in a light gray ink chamber of an exclusive cartridge of an ink jet printer ("PX-5500" manufactured by Seiko Epson Corporation). Next, the ink cartridge thus formed was fitted in the printer, and the color ink composition and the white ink composition were printed to be adhered to the same region of the recording medium by relatively the same scanning of the recording head and the recording medium, so that the formation of image was performed.

The gamut was measured when color printing and white printing (printing condition: paper selection-photo paper gloss, no-color correction, photo-1,440 dpi, and unidirectional printing) were performed under the condition in which the duty of the white ink composition was 800 on a medium (photo paper <gloss> manufactured by Seiko Epson Corporation) using the ink jet printer "PX-5500" by the above printing method. In this example, printing was performed so that the mass ratio of the white colorant to the color colorant printed on the recording medium was 200:1 to 1:1. The reason the mass ratio was wide, such as 200 to 1, was that since the usage of the color ink displaying the gamut was not constant, the mass ratio was determined based on the upper limit of the mass ratio which was obtained from a maximum white-ink usage of 200 and a minimum color-ink usage of 1.

Example 7

Figure 7:
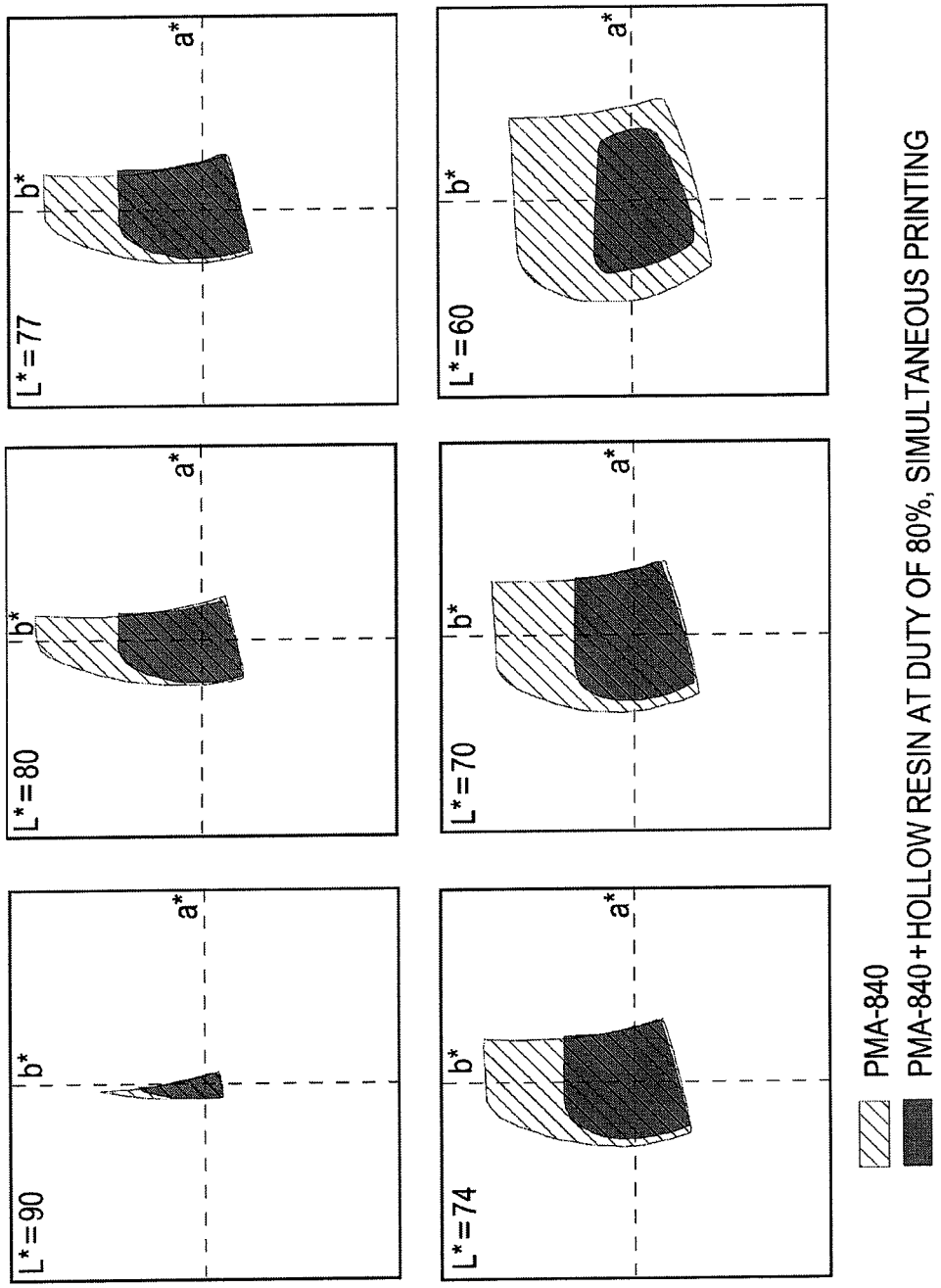
FIG. 7 shows comparisons each between a color reproducing region of a pastel color reproducible by a dye color ink composition and a color reproducing region obtained in the case (Example 7) in which the dye color ink composition and a white ink composition (hollow resin particles are used as a white colorant, and printing is performed at a duty of 80%) are adhered to the same region of a recording medium by relatively the same scanning of the recording medium and a recording head.

FIG. 7 shows comparisons each between a color reproducing region of a pastel color reproducible by a color ink composition (black, yellow, cyan, light cyan, magenta, and light magenta) under the above printing conditions and a color reproducing region obtained in the case (Example 7) in which the color ink composition and a white ink composition (ink composition 1 (hollow resin particles as a white colorant) was used) were adhered to the same region of the recording medium by relatively the same scanning of the recording medium and the recording head. The white dot was formed at a duty of 80%.

From FIG. 7, it is found that in a high luminance region (in a region in which L* is 74 or more), a region which cannot be reproduced only by the color ink composition (composite including black, yellow, cyan, light cyan, magenta, and light magenta) can be reproduced.

Example 8

Figure 8:
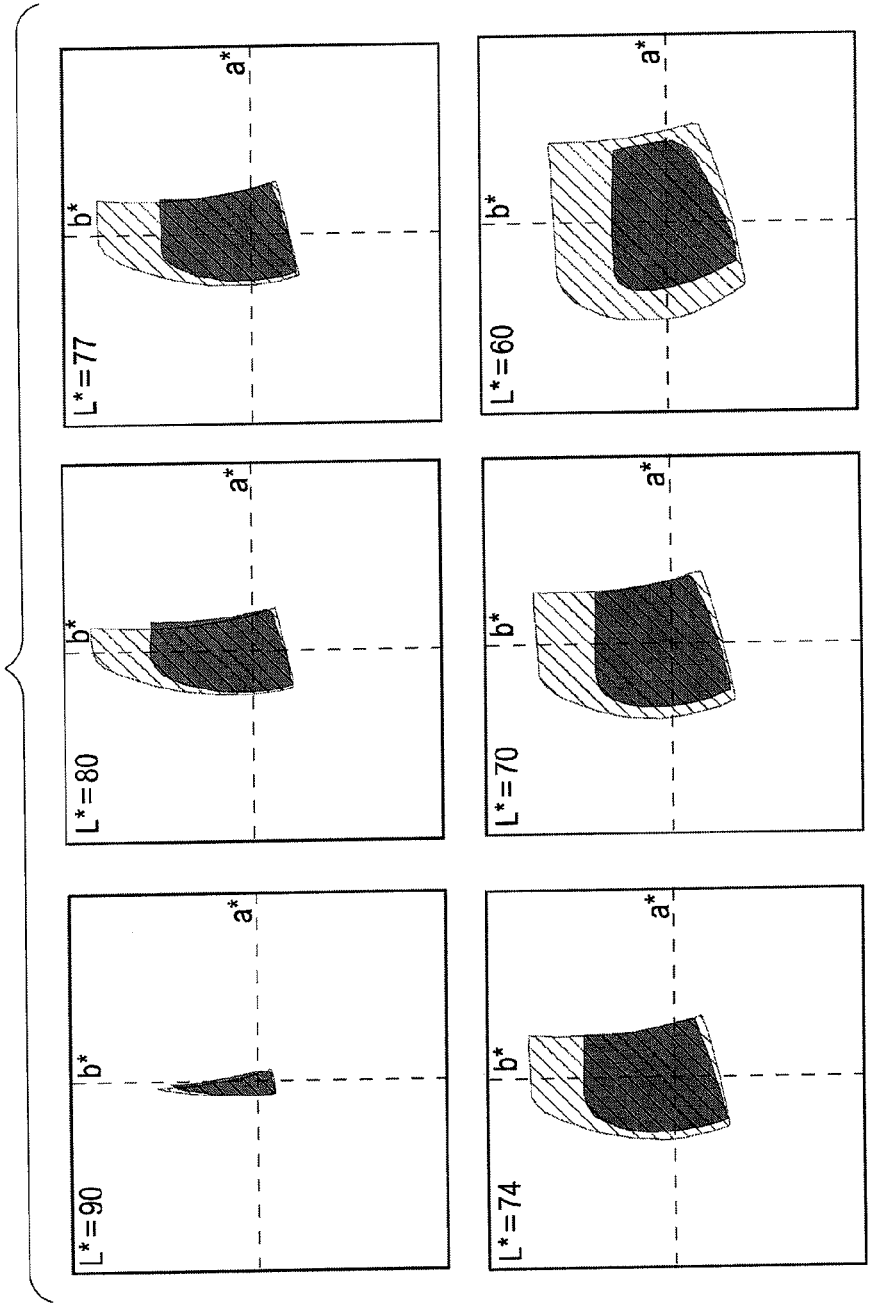
FIG. 8 shows comparisons each between a color reproducing region of a pastel color reproducible by a dye color ink composition and a color reproducing region obtained in the case (Example 8) in which the dye color ink composition and a white ink composition (titanium dioxide is used as a white colorant, and printing is performed at a duty of 80%) are adhered to the same region of a recording medium by relatively the same scanning of the recording medium and a recording head.

FIG. 8 shows comparisons each between a color reproducing region of a pastel color reproducible by a color ink composition (black, yellow, cyan, light cyan, magenta, and light magenta) under the above printing conditions and a color reproducing region obtained in the case (Example 8) in which the color ink composition and a white ink composition (ink composition 2 (titanium dioxide as a white colorant) was used) were adhered to the same region of the recording medium by relatively the same scanning of the recording medium and the recording head. The white dot was formed at a duty of 80%.

From FIG. 8, it is found that in a high luminance region (in a region in which L* is 74 or more), a region which cannot be reproduced only by the color ink composition (composite including black, yellow, cyan, light cyan, magenta, and light magenta) can be reproduced.

Since the hollow resin particles have a higher luminance than that of titanium dioxide, when printing is performed under the same conditions, an L* value at which a pastel color is obtained is high when the hollow resin particles are used. On the other hand, at a relatively low L* value, such as approximately 60 to 70, titanium dioxide is more effective.

L*a*b* Value Numerical Data

Comparison results are shown in the following Table 3 in which in FIGS. 5 to 8, an end point portion (an upper right end point of a protruding portion when compared with only the color printing) of the gamut obtained when the color ink composition and the white ink composition are adhered to the same region of the recording medium by relatively the same scanning of the recording head and the recording medium is compared with an a* value at an end point portion of the gamut obtained only by the color printing while the L* value and the b* value are fixed based on the above end point of the protruding portion. In every case, the gamut of the image sample obtained when the color ink composition and the white ink composition are adhered to the same region of the recording medium by relatively the same scanning of the recording head and the recording medium further extends in a positive a* value direction from that obtained only by the color printing.

TABLE 3

| FIGURE NUMBER | COLOR COLORANT/WHITE COLORANT | duty (%) | ADHESION OF COLOR INK AND WHITE INK ON THE SAME REGION OF RECORDING MEDIUM BY RELATIVELY THE SAME SCANNING OF RECORDING HEAD AND RECORDING MEDIUM | | | COLOR PRINTING ONLY | | | |
|---|---|---|---|---|---|---|---|---|---|
| | | | L* | $a_1$* | b* | L* | $a_2$* | b* | $\Delta a_1$*-$a_2$* |
| FIG. 5 | COLOR PIGMENT/HOLLOW RESIN PARTICLES | 80 | 90 | −6.3 | 52.6 | 90 | −6.7 | 52.6 | 0.4 |
| | | 80 | 80 | 10.7 | 60.3 | 80 | 8.2 | 60.3 | 2.5 |
| | | 80 | 70 | 27.0 | 58.4 | 70 | 26.5 | 58.4 | 0.5 |
| FIG. 6 | COLOR PIGMENT/TITANIUM DIOXIDE | 80 | 90 | −3.0 | 55.5 | 90 | −5.1 | 55.5 | 2.1 |
| | | 80 | 80 | 14.6 | 53.2 | 80 | 10.1 | 53.2 | 4.5 |
| | | 80 | 70 | 31.2 | 48.5 | 70 | 27.5 | 48.5 | 3.7 |
| | | 80 | 64 | 41.3 | 25.5 | 64 | 40.3 | 25.5 | 1.0 |
| FIG. 7 | COLOR DYE/HOLLOW RESIN PARTICLES | 80 | 90 | −1.5 | 38.8 | 90 | −3.2 | 38.8 | 1.7 |
| | | 80 | 80 | 13.5 | 44.8 | 80 | 11.2 | 44.8 | 2.3 |
| | | 80 | 70 | 23.2 | 37.6 | 74 | 22.5 | 37.6 | 0.7 |
| FIG. 8 | COLOR DYE/TITANIUM DIOXIDE | 80 | 90 | −0.7 | 50.4 | 90 | −3.6 | 50.4 | 2.9 |
| | | 80 | 80 | 15.5 | 51.2 | 80 | 10.3 | 51.2 | 5.2 |
| | | 80 | 70 | 30.6 | 40.5 | 70 | 30.5 | 40.5 | 0.1 |

Figure 9:
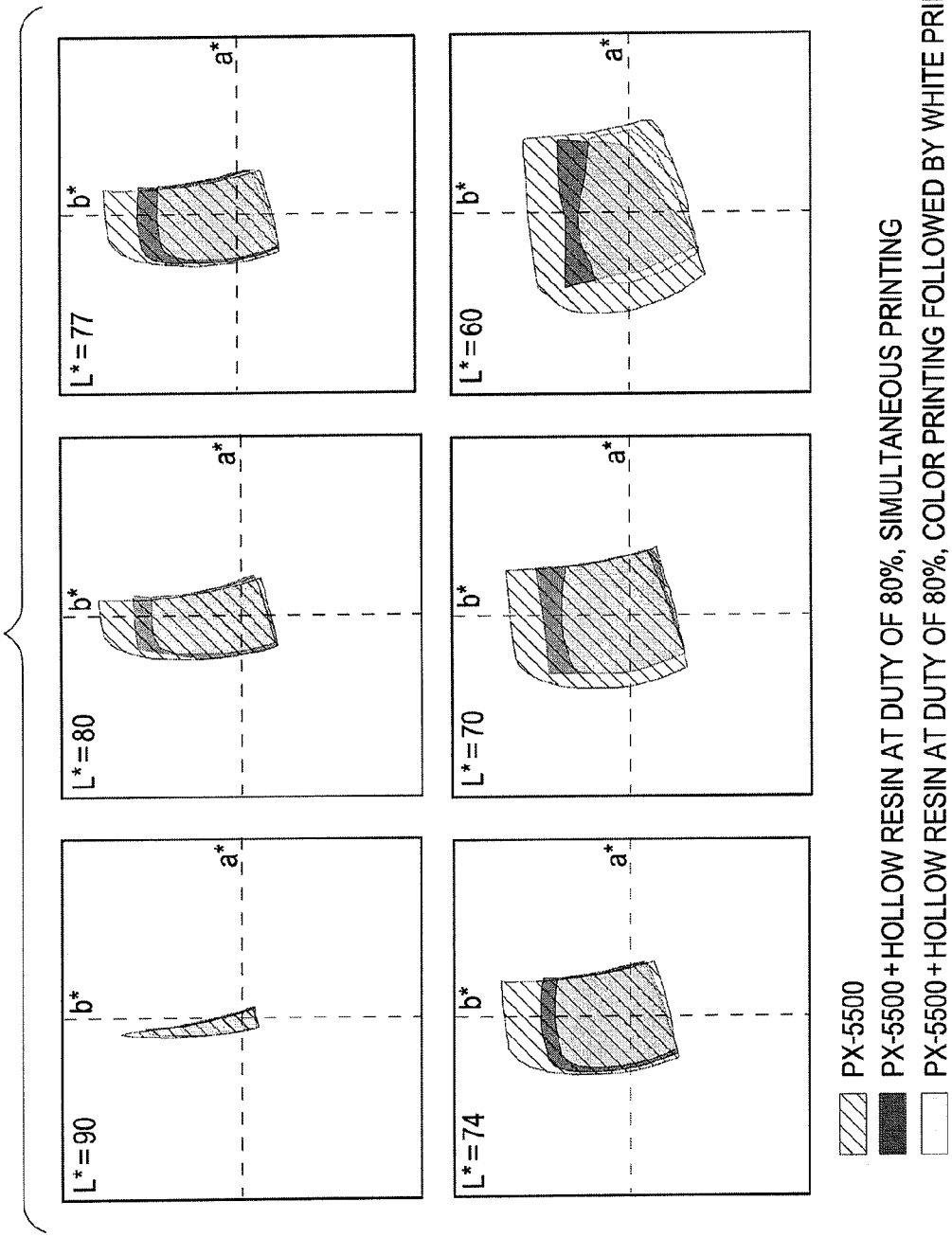
FIG. 9 shows comparisons each between the color reproducing region of a pastel color reproducible by the pigment color ink composition, the color reproducing region of Example 1, and the color reproducing region of Example 5.
Figure 10:
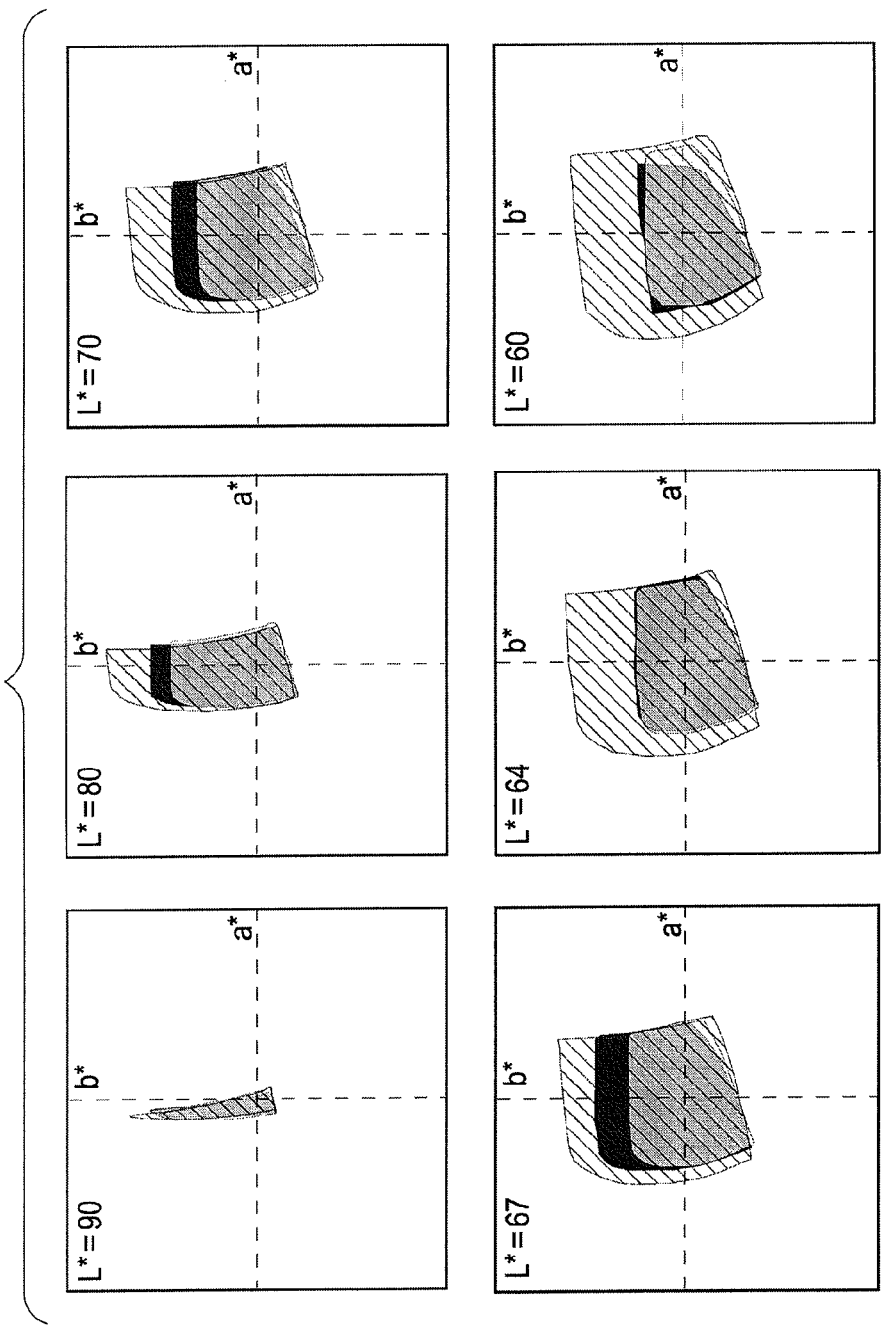
FIG. 10 shows comparisons each between the color reproducing region of a pastel color reproducible by the pigment color ink composition, the color reproducing region of Example 2, and the color reproducing region of Example 6.
Figure 11:
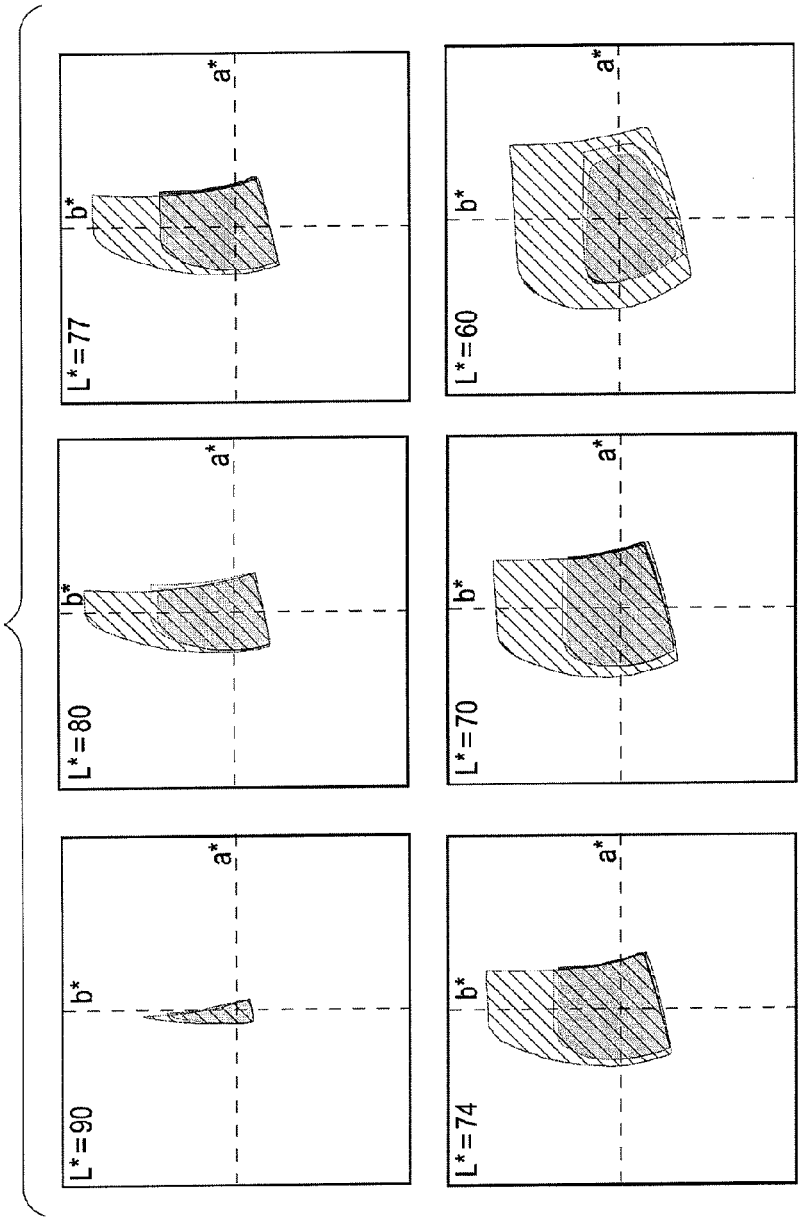
FIG. 11 shows comparisons each between the color reproducing region of a pastel color reproducible by the dye color ink composition, the color reproducing region of Example 3, and the color reproducing region of Example 7.
Figure 12:
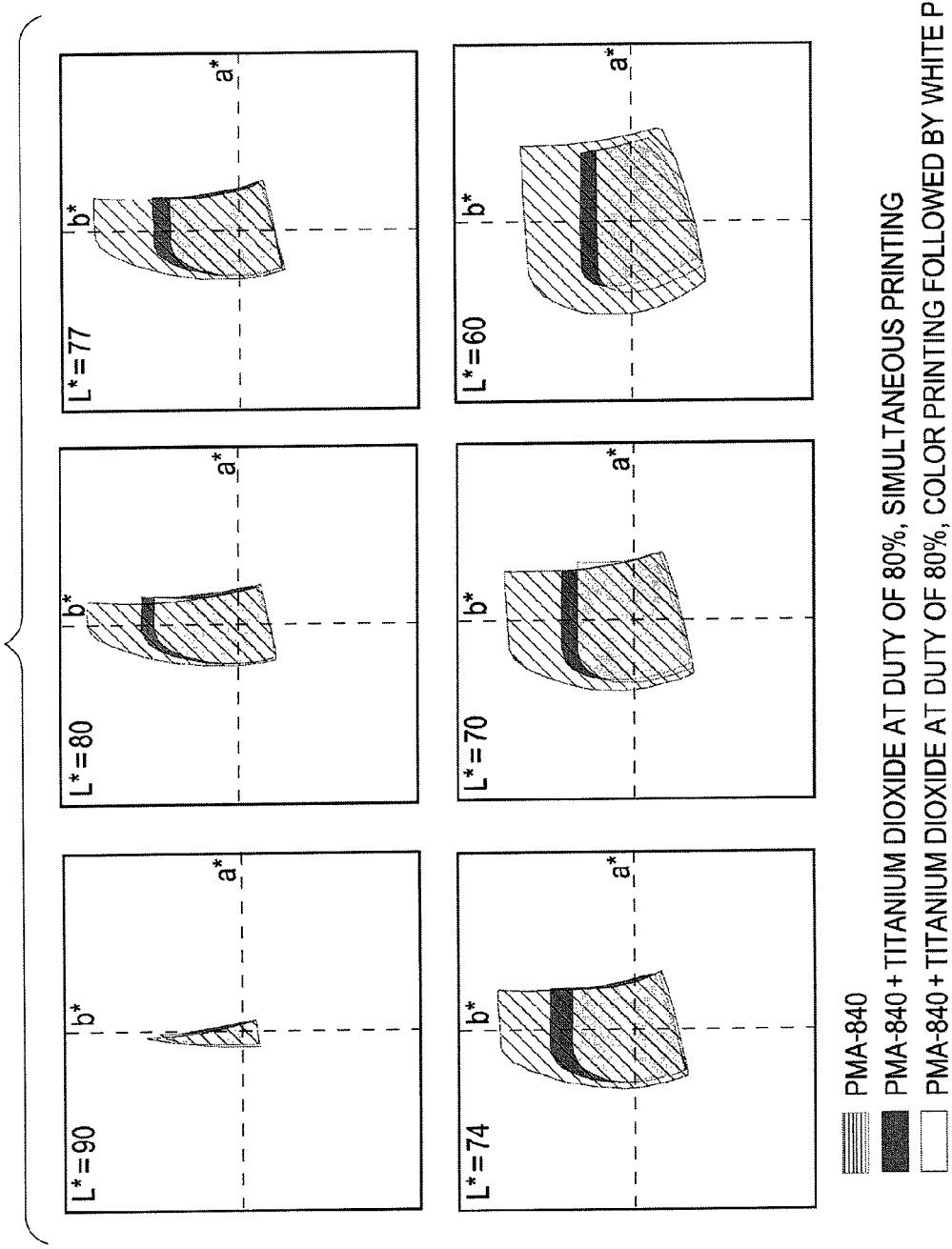
FIG. 12 shows comparisons each between the color reproducing region of a pastel color reproducible by the dye color ink composition, the color reproducing region of Example 4, and the color reproducing region of Example 8.

FIG. 9 shows comparisons each between the color reproducing region of a pastel color reproducible by the pigment color ink composition (black, yellow, cyan, light cyan, magenta, and light magenta), the color reproducing region of Example 1, and the color reproducing region of Example 5. FIG. 10 shows comparisons each between the color reproducing region of a pastel color reproducible by the pigment color ink composition (black, yellow, cyan, light cyan, magenta, and light magenta), the color reproducing region of Example 2, and the color reproducing region of Example 6. In addition, FIG. 11 shows comparisons each between the color reproducing region of a pastel color reproducible by the dye color ink composition (black, yellow, cyan, light cyan, magenta, and light magenta), the color reproducing region of Example 3, and the color reproducing region of Example 7. Furthermore, FIG. 12 shows comparisons each between the color reproducing region of a pastel color reproducible by the dye color ink composition (black, yellow, cyan, light cyan, magenta, and light magenta), the color reproducing region of Example 4, and the color reproducing region of Example 8.

From the results described above, the color reproducing region of a pastel color reproducible by forming the white layer on the color image layer and the color reproducing region of a pastel color reproducible by adhering the color ink composition and the white ink composition to the same region of the recording medium by relatively the same scanning of the recording head and the recording medium do not completely coincide with each other, that is, it is found that when the reproducing technique is selected in accordance with a desired pastel color, a more precise image can be formed.

What is claimed is:

1. An image recording method comprising:
   forming an image on a recording medium by a color ink composition containing a color colorant and a white ink composition containing a white colorant,
   wherein the color ink composition and the white ink composition are adhered in this order to the recording medium so that an equivalent ratio of the white colorant to the color colorant is set to 10 to 500:1 to form a pastel color image, and
   the white ink composition contains water as a solvent and at least one selected from an alkanediol and a glycol ether.

2. The image recording method according to claim 1,
   wherein the color ink composition and the white ink composition are adhered to the same region of the recording medium by relatively the same scanning of the recording medium.

3. The image recording method according to claim 2 comprising the step of determining a region of the recording medium in which the pastel color image is to be formed, and forming the pastel color image on the region by adhering the color ink composition and the white ink composition to the region in that order.

4. The image recording method according to claim 1, wherein in the CIE/L*a*b* color space, the pastel color is a color in which $L^*\geq 60$, $-50\leq a^*\leq 50$, and $-50\leq b^*\leq 50$ hold.

5. The image recording method according to claim 1,
   wherein the white colorant is at least one selected from the group consisting of a metal compound and hollow resin particles.

6. The image recording method according to claim 5,
   wherein the white ink composition contains at least of hollow resin particles as the white colorant.

7. The image recording method according to claim 6,
   wherein the white ink composition comprises the metal compound and wherein the content of the metal compound is 1.0 to 20.0 mass percent with respect to a total mass of the white ink composition.

8. The image recording method according to claim 6,
   wherein the white ink composition comprises the hollow resin particles and wherein the content of the hollow resin particles is 5 to 20 mass percent with respect to a total mass of the white ink composition.

9. The image recording method according to claim 5, wherein the white ink composition contains at least one of a metal compound and hollow resin particles as the white colorant.

10. The image recording method according claim 1,
    wherein the color colorant is a pigment colorant or a dye colorant.

11. The image recording method according to claim 1,
    wherein the image recording method is performed by an ink jet recording system.

12. A recording material obtained by the image recording method according to claim 1.

13. The image recording method according to claim 1,
    wherein the white ink composition comprises the metal compound and wherein the content of the metal compound is 1.0 to 20.0 mass percent with respect to a total mass of the white ink composition.

14. The image recording method according to claim 1,
    wherein the white ink composition comprises the hollow resin particles and wherein the content of the hollow resin particles is 5 to 20 mass percent with respect to a total mass of the white ink composition.

15. The image recording method according to claim 1 comprising the step of determining a region of a recording medium in which the pastel color image is to be formed, and forming the pastel color image on the region by adhering the color ink composition and the white ink composition to the region in that order.

16. An image recording method comprising:
    forming an image on a recording medium by a color ink composition containing a color colorant and a white ink composition containing a white colorant,
    wherein the color ink composition and the white ink composition are adhered in this order to the recording medium so that an equivalent ratio of the white colorant to the color colorant is set to 10 to 500:1 to form a pastel color image,
    wherein the white colorant is at least one selected from the group consisting of a metal compound and hollow resin particles, and
    the white ink composition contains water as a solvent and at least one selected from an alkanediol and a glycol ether.

17. An image recording method comprising:
    forming an image on a recording medium by a color ink composition containing a color colorant and a white ink composition containing a white colorant,
    wherein the color ink composition and the white ink composition are adhered in this order to the recording medium so that an equivalent ratio of the white colorant to the color colorant is set to 10 to 500:1 to form a pastel color image,
    wherein the color colorant is a pigment colorant or a dye colorant, and
    the white ink composition contains water as a solvent and at least one selected from an alkanediol and a glycol ether.

18. An image recording method comprising:
    forming an image on a recording medium by a color ink composition containing a color colorant and a white ink composition containing a white colorant,
    wherein the color ink composition and the white ink composition are adhered in this order to the recording medium so that an equivalent ratio of the white colorant to the color colorant is set to 10 to 500:1 to form a pastel color image, wherein the method further comprises the step of determining a region of a recording medium in which the pastel color image is to be formed, and forming the pastel color image on the region by adhering the color ink composition and the white ink composition to the region in that order, and the white ink composition contains water as a solvent and at least one selected from an alkanediol and a glycol ether.

* * * * *